US 9,986,525 B1

(12) United States Patent
Chiang et al.

(10) Patent No.: US 9,986,525 B1
(45) Date of Patent: May 29, 2018

(54) ERROR HANDLING DURING IMS SUBSCRIPTION FOR REGISTRATION STATUS

(71) Applicant: T-Mobile USA, Inc., Bellevue, WA (US)

(72) Inventors: Hsin-Fu Henry Chiang, Bellevue, WA (US); Nayla Hamade, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 15/365,817

(22) Filed: Nov. 30, 2016

(51) Int. Cl.
| H04W 60/02 | (2009.01) |
| H04W 60/04 | (2009.01) |
| H04L 29/06 | (2006.01) |
| H04L 29/14 | (2006.01) |

(52) U.S. Cl.
CPC ......... *H04W 60/02* (2013.01); *H04L 65/1016* (2013.01); *H04W 60/04* (2013.01); *H04L 65/1006* (2013.01); *H04L 65/1073* (2013.01); *H04L 69/40* (2013.01)

(58) Field of Classification Search
CPC . H04W 24/02; H04W 28/0289; H04W 60/00; H04W 60/04; H04W 36/0055; H04W 76/02; H04L 65/1073; H04L 65/1006; H04L 63/0281; H04L 65/1016; H04L 65/105; H04M 7/006
See application file for complete search history.

(56) References Cited

U.S. PATENT DOCUMENTS

| 2007/0283022 | A1 | 12/2007 | Rajko et al. |
| 2009/0103455 | A1 | 4/2009 | Balasubramanian et al. |
| 2010/0262699 | A1* | 10/2010 | Bakker ............... H04L 65/1073 709/227 |
| 2012/0117624 | A1* | 5/2012 | Khan ..................... H04L 63/10 726/3 |
| 2014/0018039 | A1* | 1/2014 | Lau ......................... H04W 8/20 455/411 |

(Continued)

OTHER PUBLICATIONS

"NGA telephony SIP User Profile", NICC ND 1033 V1.2.1, Nov. 2012, http://www.niccstandards.org.uk/files/current/ND1033V1.2.1.pdf, pp. 1-66.

(Continued)

*Primary Examiner* — Olumide T Ajibade Akonai
(74) *Attorney, Agent, or Firm* — Lee & Hayes, PLLC (57) ABSTRACT

In instances where a user equipment (UE) encounters an issue during an attempt to subscribe for registration status, the UE is configured with improved logic for handling the encountered issue. For instance, the UE may transmit a number of subsequent registration requests up to a predetermined number of registration requests before ultimately refraining from transmitting any additional registration requests. The UE may also wait until a lapse of a period of time before transmitting any next registration request and/or subscription request, thereby giving the carrier network sufficient time to resolve any recoverable issues before transmitting a next registration request and/or subscription requests. On subsequent iterations, the time period may be incremented to provide longer and longer wait times before transmitting subsequent registration requests and/or subscription requests.

17 Claims, 6 Drawing Sheets

(56) References Cited

U.S. PATENT DOCUMENTS

2014/0148169 A1* 5/2014 Li ................... H04W 36/0061
                                                                    455/437
2016/0191340 A1   6/2016 Anakkot et al.
2016/0192313 A1   6/2016 Ionescu
2016/0381729 A1* 12/2016 Lee ................... H04W 76/027
                                                                    370/310

OTHER PUBLICATIONS

PCT Search Report and Written Opinion dated Mar. 5, 2018, for PCT Application No. PCT/US17/61819, 15 pages.

* cited by examiner

ERROR HANDLING DURING IMS SUBSCRIPTION FOR REGISTRATION STATUS

BACKGROUND

The introduction of Wi-Fi™ calling has given subscribers of a carrier network the ability to make calls in areas where they don't have cell coverage by means of an available Wi-Fi access point (AP). The Wi-Fi AP can be used by the subscribers' user equipment (UE) to access the carrier network using Wi-Fi calling in lieu of voice over Long Term Evolution (VoLTE), which uses a cell site to access the carrier network. Despite this benefit, an attempt to utilize Wi-Fi calling may sometimes result in the carrier network prohibiting service to the UE, such as when the subscriber's location cannot be ascertained. One reason, among others, for prohibiting service when the subscriber's location cannot be ascertained is for purposes of calling 911. For example, federal regulations specify that a subscriber is to have a reasonable expectation that he/she can dial 911 and be routed to the correct (i.e., nearest) public safety answering point, which depends on the carrier being able to ascertain the subscriber's location. Thus, in a situation where a subscriber's 911 location is not ascertainable, the subscriber's UE, in attempting to subscribe for registration status (e.g., by sending a Session Initiation Protocol (SIP) request using the SUBSCRIBE method), may receive a subscription error (e.g., 403 forbidden), or a SIP response using the NOTIFY method to specify a terminated registration status. In either case, the result is that service is prohibited for the subscriber (e.g., prohibiting voice calling service over Wi-Fi).

The manner in which existing UEs handle such errors is suboptimal. For instance, the existing $3^{rd}$ Generation Partnership Project (3GPP) standards specify that a UE, in encountering issues during subscription for registration status, should immediately attempt to register for service again in an effort to provide service to the subscriber. However, for the reasons noted above, a missing 911 location constitutes an "unrecoverable" error in the sense that the issue will never be resolved as long as the 911 location remains unascertainable, regardless of how many times the UE attempts to register for service. Thus, a UE, following 3GPP standards, may be caught in a continuous loop of registration failures when 911 location is missing. This is suboptimal because, when a high number of UEs are engaged in similar registration attempts, a large amount of network traffic is created, causing large-scale network bandwidth reduction. In some instances, a large number of UEs may be continuously sending, and re-sending, registration attempts to the carrier network, which can result in a complete network outage.

In addition to a missing 911 location, other issues, such as high network congestion, may arise when a UE is attempting to subscribe for registration status, which can prevent a UE from successfully registering for service. Some of these other types of issues, unlike the missing 911 location, may be "recoverable" in the sense that, given enough time, the issue will eventually resolve itself (e.g., network congestion will eventually subside), and a UE may eventually succeed in registering for service upon resolution of the issue. The existing 3GPP 24.229 specification describes that the network, in some instances, can transmit a response (e.g., a 503 response) to a failed registration attempt with a "Retry-After" header field value indicating a wait time (typically 300 seconds) that the UE should wait before attempting a next registration. However, these 3GPP UE procedures are not optimized to resolve some recoverable issues, such as high network congestion. For example, when network congestion is particularly high, many UEs can be engaged in re-registration attempts at the same time (due to immediate retry attempts or retries attempted at the same, fixed intervals), which does not provide enough time for the congestion in the network to subside. Thus, existing UE procedures for handling errors during subscription for registration status may cause recoverable errors to persist, thereby preventing service for potentially large numbers of UEs.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for improved handling, by a UE, of issues encountered during subscription for registration status. Before establishing a communication session (e.g., a voice call), a UE is configured to subscribe for registration status by transmitting a subscription request, such as a SIP request using the SUBSCRIBE method. The subscription request is transmitted to an Internet Protocol Multimedia Subsystem (IMS) node (e.g., a proxy call session control function (P-CSCF) node). In response to the subscription request, the UE can receive various types of subscription responses from the IMS node. When the UE receives a 200 OK SIP response followed by an additional SIP response using the NOTIFY method and specifying an active registration status, the UE is successfully registered for service and, for purposes of the discussion herein, if the subscription request was a first attempt at subscribing for registration status, the UE is considered to have not encountered any issues during the UE's subscription for registration status.

However, there are instances where the UE can encounter an issue in attempting to subscribe for registration status. For purposes of the discussion herein, any subscription response from the IMS node other than the above-mentioned 200 OK SIP response is considered an "error" (sometimes referred to as a "subscription error") in the subscription response that rejects the subscription request. Various types of subscription errors can be specified in a subscription response, including, without limitation, a 3xx, 4xx, 5xx, or 6xx error type. Alternatively, the IMS node can first transmit a 200 OK SIP response to the UE followed by a SIP response that notifies the UE of a terminated registration status (e.g., a SIP response using the NOTIFY method specifying a terminated registration status).

In response to receiving a subscription error, or a notification of a terminated registration status, techniques and systems disclosed herein can be implemented by the UE to respond to the encountered issue in an improved manner, as compared to existing UE procedures. In some embodiments, if the UE receives a subscription response that either (i) rejects the subscription request by specifying a type of error in a first error category, or (ii) notifies the device of a terminated registration status, the UE is configured to transmit a number of subsequent registration requests up to a predetermined number of registration requests before ultimately refraining from transmitting any additional registration requests. For instance, the UE, in response to the above-mentioned issues exhibited in a subscription response, can determine whether a number of registration requests transmitted from the device to the IMS node is equal to a predetermined number of registration requests. So long, as the number of transmitted registration requests is less than the predetermined number of registration requests, the UE can transmit an additional registration request in order to "try again" to successfully register. However, upon determining that the number of transmitted registration requests equals the predetermined number of registration requests, the UE refrains from transmitting any additional registration requests until the occurrence of a trigger event.

By halting the transmission of any additional registration requests after a predetermined number of registration requests have been transmitted, the UE can reduce network bandwidth consumption in the carrier network by deducing that any additional registration requests are highly unlikely to result in successful registration. This may be the case where the carrier cannot ascertain a 911 location for the subscriber of the UE. In this case, network bandwidth would be needlessly consumed by the UE in attempting to register for service, whereas refraining from transmitting any additional registration requests after a predetermined number of registration requests have been transmitted saves this available network bandwidth for other processes.

In other embodiments, if the UE encounters any issue during subscription for registration status, the UE can be configured to wait until a lapse of a period of time before transmitting a subsequent SIP request to the IMS node. The period of time can be determined "on the fly" when the issue is encountered during an attempt to subscribe for registration status. The period of time can also be determined based at least in part on a number of subscription requests or a number of registration requests that have been transmitted by the UE to the IMS node.

In some embodiments, for each subsequent issue encountered during subscription for registration status, a period of time can be determined that is greater than a previous period of time determined for the previous iteration. For example, the UE may encounter an issue with a first attempted request to the IMS node, wait a first period of time before transmitting a second attempted request, and if the issue is again encountered with regards to the second attempted request, the UE can wait a second period of time that is longer than the first period of time before transmitting a third attempted request, and so on. In other words, the UE can wait longer and longer periods of time before transmitting subsequent requests to the IMS node, thereby giving the carrier network longer and longer periods of time to resolve any recoverable issues before transmitting any subsequent requests to the IMS node. By the UE waiting longer and longer periods of time before transmitting subsequent requests to the IMS node, the UE eventually reduces network bandwidth consumption for a period of time that is sufficient to allow particular issues to resolve themselves, thereby allowing service to be provided to UEs of the carrier network.

In general, processes are disclosed herein for implementation on a UE with improved handling of issues encountered during subscription for registration status. Also disclosed herein are systems and devices comprising one or more processors and one or more memories, as well as non-transitory computer-readable media storing computer-executable instructions that, when executed, by one or more processors perform various acts and/or processes disclosed herein.

Figure 1:
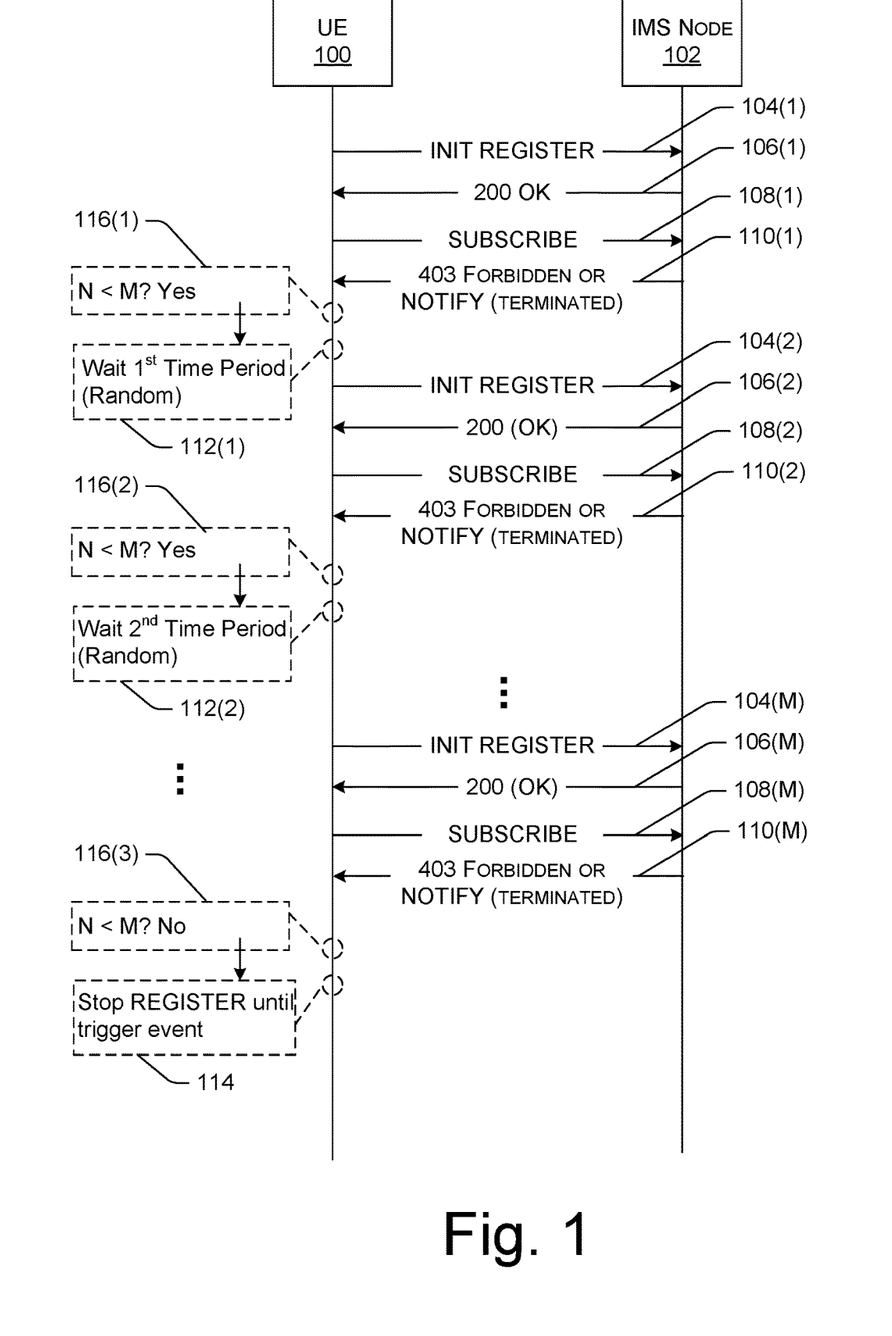
FIG. 1 is a diagram illustrating example signaling between a UE and a network node when the UE encounters an example issue during subscription for registration status, FIG. 1 illustrating improved UE logic for responding to the issue.

FIG. 1 is a diagram illustrating example signaling between a UE 100 and an IMS node 102. FIG. 1 illustrates a scenario where the UE 100 encounters example issues during the UE's 100 subscription for registration status, and the UE's 100 implementation of improved logic for responding to the issue.

In accordance with various embodiments described herein, the terms "user equipment (UE)," "wireless communication device," "wireless device," "communication device," "mobile device," and "client device," may be used interchangeably herein to describe any UE (e.g., the UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. The UE 100 may be implemented as any suitable type of computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like.

In general, a user can utilize the UE 100 to communicate with other users and associated UEs via an IMS core (sometimes referred to as the "IMS core network," the "IMS network," the "Core Network (CN)," or the "IM CN Subsystem"). IMS is an architectural framework defined by 3GPP for delivering Internet Protocol (IP) multimedia to a UE, such as the UE 100. The IMS core can be maintained and/or operated by one or more service providers, such as one or more wireless carriers ("carriers"), that provide IMS-based services to users (sometimes called "subscribers") who are associated with UEs, such as the UE 100. For example, a service provider may offer multimedia telephony services that allow a subscribed user to call or message other users via the IMS core using his/her UE. A subscriber can also utilize an associated UE to receive, provide, or otherwise interact with various different IMS-based services by accessing the IMS core. FIG. 1 illustrates an example IMS node 102 that the UE 100 can communicate with for these purposes. In some embodiments, the IMS node 102 represents a P-CSCF node that is one of many nodes of the IMS core, but the IMS node 102 can represent any other suitable IMS node other than a P-CSCF node.

Accordingly, an operator of the IMS core may offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (i.e., a voice-based communication session, such as a VoLTE call, or a Wi-Fi call).

The UE 100 is also configured to utilize various radio access networks (RANs) in order to access the IMS core, such as via the IMS node 102. In general, the IMS core is agnostic to the access technology that is used to connect a UE to the IMS core. In this manner, the UE 100 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves communicating with the IMS core through a Wi-Fi AP. Providing access to the IMS core through non-3GPP RANs has opened the door to recent advancements in IMS-based services, such as the introduction of Wi-Fi calling, which allows users to initiate and receive calls over an available Wi-Fi AP.

When the subscriber of the UE 100 powers on the UE 100, the UE 100 is configured to execute boot code and perform various initialization procedures. Eventually, the UE 100 will try to "attach" to the carrier network to whom the user has subscribed in order to transmit data to, and receive data from, the IMS core. To do this, the UE 100 initiates registration by transmitting a first registration request 104(1) to the IMS node 102, which, as noted above, may represent a P-CSCF node. In the case of access by the UE 100 via a non-3GPP RAN, the first registration request 104(1) can be transmitted from the UE 100, via the non-3GPP RAN (e.g., a Wi-Fi AP and the Internet), to the IMS node 102.

Session Initiation Protocol (SIP) may be used for transmitting messages, such as registration messages, subscription messages, communication session messages, and the like, to the IMS core (e.g., to the IMS node 102), and for receiving messages therefrom. SIP is a signaling protocol that can be used to establish, modify, and terminate multimedia sessions (e.g., a multimedia telephony call) over packet networks, and to authenticate access to IMS-based services. As used herein, a "SIP request" is a message that is sent from a UE, such as the UE 100, to the IMS core (e.g., the IMS node 102) using SIP protocol, and a "SIP response"

is a message that is sent from the IMS core (e.g., the IMS node 102) to a UE, such as the UE 100, using SIP protocol.

Accordingly, the first registration request 104(1) can comprise a SIP request using the SIP REGISTER method. FIG. 1 shows the first registration request 104(1) as an "INIT REGISTER" request to indicate that the registration status is initially designated as an initial registration status, prior to its designation as either an active registration status or a terminated registration status. The IMS node 102, upon receipt of the first registration request 104(1), can send a first registration response 106(1) comprising a 200 OK response to the UE 100. The 200 OK response received by the UE 100 indicates to the UE 100 that the first registration request 104(1) was received by the IMS node 102. It is to be appreciated that a registration request 104 followed by a registration response 106 comprising a 200 OK response can represent a simplified version of an unprotected registration request transmitted from the UE 100 to the IMS node 102, followed by a 401 unauthorized (challenge request) response received at the UE 100 from the IMS node 102, followed by a protected registration request transmitted from the UE 100 to the IMS node 102, followed by a 200 OK response. Alternatively, the UE 100 may receive a registration error in the first registration response 106(1), but the assumption, for purposes of the discussion of FIG. 1, is that the first registration response 106(1) comprises a 200 OK response.

In response to receiving the first registration response 106(1) from the IMS node 102 comprising the 200 OK response, the UE 100 can then transmit a first subscription request 108(1) to the IMS node 102 in order to subscribe for notification of the UE's 100 registration status. The first subscription request 108(1) can comprise a SIP request using the SUBSCRIBE method. The SUBSCRIBE method is generally used to initiate a subscription for notification of events; in this case, the subscription is for notification of the UE's 100 registration status (i.e., a REG event).

As noted above, FIG. 1 illustrates a scenario where the UE 100 encounters one or more types of issues in response to the UE's 100 attempt to subscribe for registration status via the first subscription request 108(1). For example, FIG. 1 illustrates that the IMS node 102 transmits a first subscription response 110(1) to the UE 100 that either (i) rejects the first subscription request 108(1) by specifying a type of error in a first error category (e.g., a first error category comprising a 403 forbidden error), or (ii) notifies the UE 100 of a terminated registration status. In the latter scenario, the IMS node 102 may first transmit a SIP response comprising a 200 OK response to the first subscription request 108(1), followed by a SIP response to the UE 100 using the NOTIFY method specifying a terminated registration status.

FIG. 1 illustrates two general techniques for responding to such issues as compared to existing UE procedures. A first technique is to wait until a lapse of a first period of time 112(1) before transmitting a subsequent registration request to the IMS node 102. The first period of time 112(1) can be determined "on the fly" in response to receiving the first subscription response 110(1) from the IMS node 102. In some embodiments, the first period of time 112(1) can be determined based at least in part on a number of subscription requests (e.g., the subscription request 108(1)) or a number of registration requests (e.g., the registration request 104(1)) that have been transmitted by the UE 100 to the IMS node 102. In the example of FIG. 1, at the time that the UE 100 receives the first subscription response 110(1) where the issue is encountered, there has been one registration request 104(1) transmitted to the IMS node 102, and similarly, one subscription request 108(1) transmitted to the IMS node 102. Using either of these numbers as "N" in the following Equation (1), the UE 100 can determine the first period of time 112(1) as:

$$T=0.5W\sim W \text{ (Random); where } W=\text{Base Time}\times 2^N \quad (1)$$

Equation (1) indicates that the first period of time, $T_1$ (112(1)), can comprise a randomly selected time that falls within a time range of 0.5W to W, where W is calculated using a Base Time and a number, N, which represents either a number of subscription requests or registration requests that have been transmitted from the UE 100 to the IMS node 102. For example, if the Base Time=30 seconds, and the number, N, of previous subscription requests or registration requests is equal to 1, then W=60 seconds, and the first period of time, $T_1$ (112(1)), is a randomly selected value within a time range of 30 seconds and 60 seconds, according to Equation (1). Thus, the first period of time, $T_1$ (112(1)), is based at least in part on the value of N, which can represent the number of previous subscription requests or registration requests.

In some embodiments, the period of time 112 (e.g., the first period of time, $T_1$) calculated pursuant to Equation (1) can be superseded, in some instances, by a wait time value that is indicated in a Retry-After header field of the first subscription response 110(1) (or in a Retry-After header field of a different response that is transmitted before or after the first subscription response 110(1)). Instances where the a Retry-After header field value may supersede the period of time 112 calculated with Equation (1) is when the wait time value specified in the Retry-After header field of a response message is greater than the period of time 112. For example, if the first period of time, $T_1$ (112(1)), is a randomly selected value within a time range of 30 seconds and 60 seconds, according to Equation (1), and the UE 100 receives a response (e.g., the first subscription response 110(1)) with a Retry-After header field value of 300 seconds, then the UE 100 can wait until a lapse of the wait time value of 300 seconds specified in the Retry-After header field due to 300 seconds being greater than a value within the range of 30 seconds and 60 seconds. However, in instances where the period of time 112 calculated with Equation (1) is greater than or equal to the wait time value specified in a Retry-After header field, the UE 100 may be configured to wait until lapse of the period of time 112 calculated with Equation (1) instead of the wait time value specified in the Retry-After header field.

Continuing with the example of FIG. 1, the UE 100 is configured to wait until the first period of time 112(1) has lapsed before transmitting a second registration request 104(2) to the IMS node 102. This is in contrast to existing UE procedures that do not wait to transmit the second registration request; instead, existing UEs transmit a follow-up registration request immediately in response to encountering an issue during subscription for registration status. Thus, the technique shown in FIG. 1 of waiting a period of time 112(1) before transmitting the second registration request 104(2) gives components of the carrier network time to recover from an issue that may be resolved with time, such as high network congestion.

In response to the second registration request 104(2), the UE 100 may receive a second registration response 106(2) from the IMS node 102. The second registration response 106(2) can comprise another 200 OK response, as shown in FIG. 1.

The UE 100 may then transmit a second subscription request 108(2) to the IMS node 102. In response, the UE 100 may encounter the same issue as the UE 100 encountered with the first registration attempt; namely, a second subscription response 110(2) that either (i) rejects the second subscription request 108(2) by specifying a type of error in the first error category (e.g., a first error category comprising a 403 forbidden error), or (ii) notifies the UE 100 of a terminated registration status.

In response to receipt of the second subscription response 110(2) where the UE 100 encounters the issue noted above, the UE 100 can now wait until a lapse of a second period of time 112(2) before transmitting a subsequent registration request to the IMS node 102. The second period of time 112(2) is different than the first period of time 112(1) in that the second period of time 112(2) is greater (or longer) than the first period of time 112(1). For example, utilizing Equation (1), above, and noting that N=2 at the time of receiving the second subscription response 110(2)—because there have been two subscription requests (108(1) and 108(2)) transmitted to the IMS node 102 and, similarly, two registration requests (104(1) and 104(2)) transmitted to the IMS node 102—the second period of time, $T_2$ (112(2)), can be calculated as $T_2=0.5W\sim W$ (Random); where W=Base Time$\times 2^2$. For a Base Time=30 seconds, the second time period, $T_2$ (112(2)), is a randomly selected value between 60 seconds and 120 seconds. Thus, in the above example, the first time period, $T_1$(112(1)), is selected as a time period between 30 seconds and 60 seconds, while the second time period, $T_2$ (112(2)), is selected as a time period between 60 seconds and 120 seconds.

FIG. 1 illustrates that this technique of waiting a longer and longer period of time before transmitting a subsequent registration request to the IMS node 102 can be performed for any suitable number of iterations up to an Mt attempt at registering for service. This illustrates the second general technique that can be implemented by the UE 100, which is to stop (or refrain from) transmitting any additional registration requests at 114 after the UE 100 encounters the same issue during subscription for registration status for an Mt time. For instance, upon receipt of the first subscription response 110(1) where the issue is first encountered, the UE 100 is configured to determine whether a number of registration requests transmitted from the UE 100 to the IMS node 102 (i.e., N in Equation (1), above) is less than a predetermined number, M, (e.g., a maximum number) of registration requests at 116(1). Alternatively, the UE 100 may determine whether the number, N, of previous registration requests transmitted is equal to the predetermined number, M, of registration requests at 116(1). In either case, at 116(1), N=1 because one registration request 104(1) has been transmitted to the IMS node 102 at the time of the determination at 116(1). If the predetermined number, M, is set to 3, then N is less than M because 1 is less than 3, and the UE 100 transmits the second registration request 104(2).

Upon receipt of the second subscription response 110(2) where the UE 100 encounters the same issue, the UE 100 is configured to check the updated value of N against the predetermined number, M, at 116(2). In the example of FIG. 1, upon receipt of the second subscription response 110(2), N=2 because there have been two registration requests (104(1) and 104(2)) transmitted to the IMS node 102 at the time of the determination at 116(2). Again, if the predetermined number, M, of registration requests is set to three, the logic at 116(2) will determine that N is less than M because 2 is less than 3, and the algorithm continues to execute another iteration of transmitting a registration request.

At 116(3), the UE 100 determines that N (the number of previous registration requests 104 transmitted to the IMS node 102) is equal to the predetermined number, M, and in response, the UE 100, at 114, refrains from transmitting any additional registration requests to the IMS node 102 so as to avoid needlessly consuming network bandwidth in the face of an issue that is unlikely to resolve itself with more time. Halting the transmission of any additional registration requests at 114 after transmitting a predetermined number, M, of registration requests may be useful in a situation where the 911 location for the subscriber of the UE 100 cannot be ascertained by the carrier. This issue would not resolve itself with more time, and therefore, it makes sense to stop attempting registration if the 911 location is unlikely to be ascertained.

Of course, the first technique of waiting a period of time 112 before transmitting a next registration request 104 can be implemented without also implementing the second technique of refraining from transmitting any additional registration requests upon transmitting a predetermined number, M, of registration requests 104. Alternatively, the second technique of refraining from transmitting any additional registration requests upon transmitting a predetermined number, M, of registration requests 104 can be implemented without also implementing the first technique of waiting a period of time 112 before transmitting a next registration request 104. In some embodiments, both the first technique and the second technique can be implemented together, as shown in FIG. 1.

Figure 2:
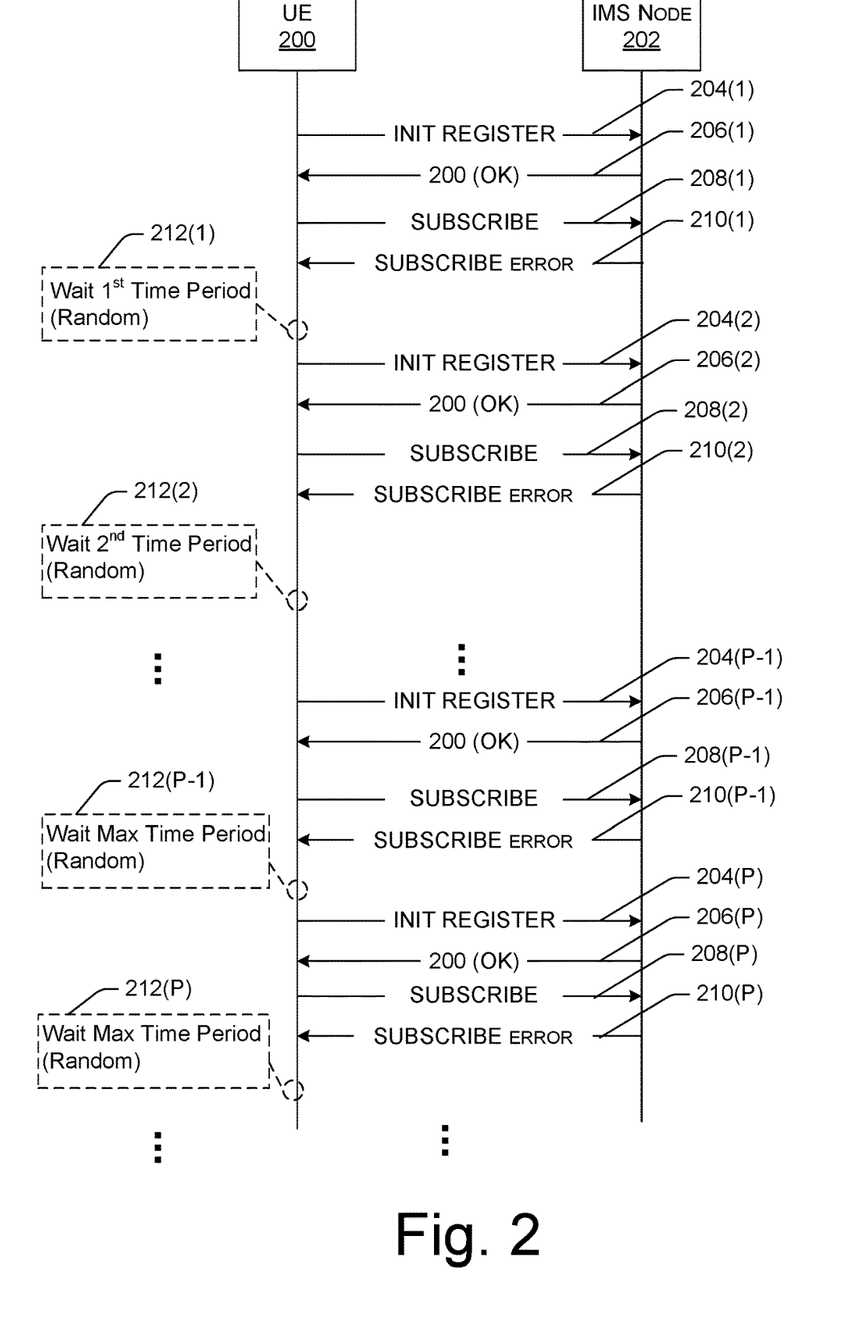
FIG. 2 is a diagram illustrating example signaling between a UE and a network node when the UE encounters another example issue during subscription for registration status, FIG. 2 illustrating improved UE logic for responding to the issue.

FIG. 2 is a diagram illustrating example signaling between a UE 200 and a network node 202 when the UE 200 encounters another example issue during subscription for registration status. In FIG. 2, the UE 200 initiates registration by transmitting a first registration request 204(1) to the IMS node 202. As in FIG. 1, the first registration request 204(1) can comprise a SIP request using the SIP REGISTER method. FIG. 2 also shows the first registration request 204(1) as an "INIT REGISTER" request to indicate that the registration status is initially designated as an initial registration status, prior to its designation as either an active registration status or a terminated registration status.

The IMS node 202, upon receipt of the first registration request 204(1), can send a first registration response 206(1) comprising a 200 OK response to the UE 200. Alternatively, the UE 200 may receive a registration error in the first registration response 206(1), but the assumption, for purposes of the discussion of FIG. 2, is that the first registration response 206(1) comprises a 200 OK response.

In response to receiving the first registration response 206(1) from the IMS node 202 comprising the 200 OK response, the UE 200 can then transmit a first subscription request 208(1) to the IMS node 202 in order to subscribe for notification of the UE's 200 registration status. The first subscription request 208(1) can comprise a SIP request using the SUBSCRIBE method that is generally used to initiate a subscription for notification of events; in this case, the subscription is for notification of the UE's 200 registration status (i.e., a REG event).

FIG. 2 illustrates a scenario where the UE 200 encounters a slightly different type of issue than the issue encountered by the UE 100 in FIG. 1. For instance, in response to the UE's 200 attempt to subscribe for registration status via the first subscription request 208(1), the IMS node 202 transmits a first subscription response 210(1) to the UE 200 that rejects the first subscription request 208(1) by specifying a type of error in a second error category (e.g., a second error category comprising a 504 error type with a message body containing "initial registration" and a transaction timeout (Timer F expired) pursuant to 3GPP 24.229 5.1.2A.1.6, or a second error category comprising a 408 or 504 error type with no message body). In response to encountering an error in the second error category in the first subscription response 210(1), the UE 200 is configured to wait until a lapse of a first period of time 212(1) before transmitting a subsequent registration request to the IMS node 202. Similar to the technique described with reference to FIG. 1, the first period of time 212(1) can be determined "on the fly" in response to receiving the first subscription response 210(1) from the IMS node 202, and the first period of time 212(1) can be determined based at least in part on a number of subscription requests (e.g., the subscription request 208(1)) or a number of registration requests (e.g., the registration request 204(1)) that have been transmitted by the UE 200 to the IMS node 202. For example, the UE 200 can determine the first period of time 212(1) based on Equation (1), above, which determines the first period of time 212(1) based on a randomly selected time that falls within a time range of 0.5W to W, where W is calculated using a Base Time and a number, N, which represents either a number of subscription requests or registration requests that have been transmitted from the UE 200 to the IMS node 202. The examples and techniques for determining the individual periods of time 112, as described in FIG. 1, can also apply to determining the periods of time 212 in FIG. 2.

In some embodiments, the period of time 212 (e.g., the first period of time, $T_1$) calculated pursuant to Equation (1) can be superseded, in some instances, by a wait time value that is indicated in a Retry-After header field of the first subscription response 210(1) (or in a Retry-After header field of a different response that is transmitted before or after the first subscription response 210(1)). For example, similar to that described above with reference to FIG. 1, a Retry-After header field value may supersede the period of time 212 calculated with Equation (1) if the wait time value specified in the Retry-After header field of a response message is greater than the period of time 212. In these instances, the UE 200 may wait a period of time specified in the Retry-After header field before transmitting a subsequent registration request to the IMS node 202.

Thus, the UE 200, after waiting for the first period of time 212(1) to lapse, transmits a second registration request 204(2). In response to the second registration request 204(2), the UE 200 may receive a second registration response 206(2) from the IMS node 202. The second registration response 206(2) can comprise another 200 OK response, as shown in FIG. 2.

The UE 200 may then transmit a second subscription request 208(2) to the IMS node 202. In response, the UE 200 may encounter the same issue as the UE 200 encountered with the first registration attempt; namely, a second subscription response 210(2) that again specifies a type of error in the second error category (e.g., a second error category comprising a 504 error type with a message body containing "initial registration" and a transaction timeout (Timer F expired) pursuant to 3GPP 24.229 5.1.2A. 1.6, or a 408 or 504 error type with no message body).

In response to receipt of the second subscription response 210(2) where the UE 200 encounters the issue noted above, the UE 200 can now wait until a lapse of a second period of time 212(2) before transmitting a subsequent registration request to the IMS node 202. The second period of time 212(2) is different than the first period of time 212(1) in that the second period of time 212(2) is greater (or longer) than the first period of time 212(1). For example, utilizing Equation (1), above, and noting that N=2 at the time of receiving the second subscription response 210(2)—because there have been two subscription requests (208(1) and 208(2)) transmitted to the IMS node 202 and, similarly, two registration requests (204(1) and 204(2)) transmitted to the IMS node 202—the second period of time, $T_2$ (212(2)), can be calculated as $T_2=0.5W\sim W$ (Random); where W=Base Time×$2^2$. For a Base Time=30 seconds, the second time period, $T_2$ (212(2)), is a randomly selected value between 60 seconds and 120 seconds. Thus, in the above example, the first time period, $T_1$ (212(1)), is selected as a time period between 30 seconds and 60 seconds, while the second time period, $T_2$ (212(2)), is selected as a time period between 60 seconds and 120 seconds.

FIG. 2 shows that this "time period" technique can iterate any number of times, and in some cases indefinitely, or at least until some type of event, such as powering down the UE 200 that otherwise stops the process. It is to be appreciated that the example of FIG. 1 can also iterate an indefinite number of times without stopping after the $M^{th}$ registration request.

FIG. 2 also illustrates that the time period determination algorithm can have a maximum time period. Accordingly, when W from Equation (1) meets or exceeds the maximum time period at iteration P−1, the period of time 212(P−1) that the UE 200 waits before transmitting the next registration request 204(P) equals a randomly selected value within a range of 0.5× the maximum time period and the maximum time period. Furthermore, any subsequent iterations also wait a time period 212 equal to a randomly selected value within a range of 0.5× the maximum time period and the maximum time period. For example, the time period at 212(P) in FIG. 2 can be different from the time period at 212(P−1) because they are randomly determined time periods, but neither time period 212 is to exceed the maximum time period (e.g., a maximum value for W of 1800 seconds). Thus, the maximum time period acts as a "cap," and the time period determined by the UE 200 for waiting to transmit a next registration request 204 does not exceed the maximum time period. This can be based on a heuristic that known issues are likely to resolve themselves within the maximum time period, and waiting longer than the maximum time period is unlikely to make any difference to the UE 200.

Figure 3:
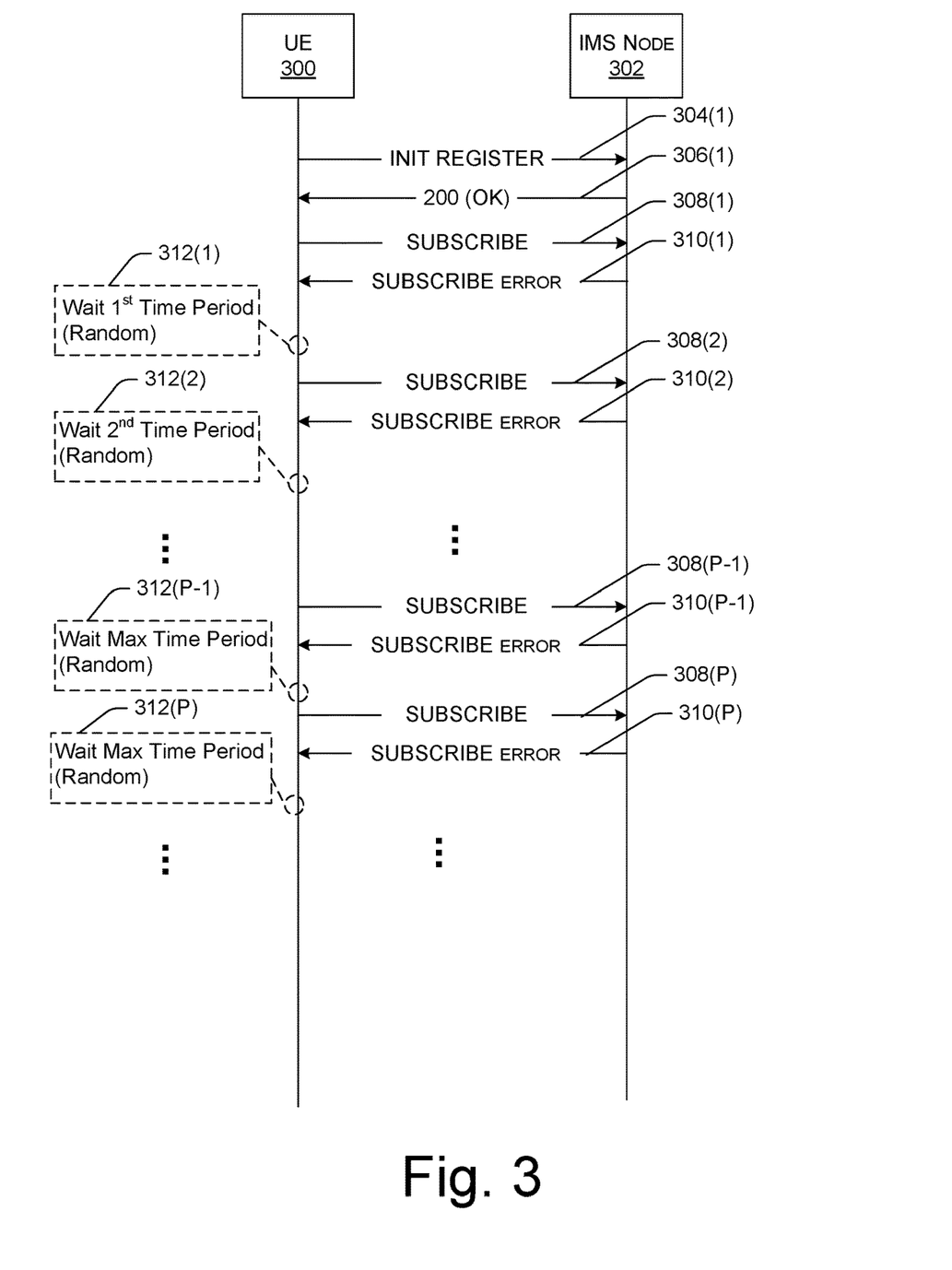
FIG. 3 is a diagram illustrating example signaling between a UE and a network node when the UE encounters another example issue during subscription for registration status, FIG. 3 illustrating improved UE logic for responding to the issue.

FIG. 3 is a diagram illustrating example signaling between a UE 300 and a network node 302 when the UE 300 encounters another example issue during subscription for registration status. In FIG. 3, the UE 300 initiates registration by transmitting a first registration request 304(1) to the IMS node 302. As in FIGS. 1 and 2, the first registration request 304(1) can comprise a SIP request using the SIP REGISTER method. FIG. 3 also shows the first registration request 304(1) as an "INIT REGISTER" request to indicate that the registration status is initially designated as an initial registration status, prior to its designation as either an active registration status or a terminated registration status.

The IMS node 302, upon receipt of the first registration request 304(1), can send a first registration response 306(1) comprising a 200 OK response to the UE 300. Alternatively, the UE 300 may receive a registration error in the first registration response 306(1), but the assumption, for purposes of the discussion of FIG. 3, is that the first registration response 306(1) comprises a 200 OK response.

In response to receiving the first registration response 306(1) from the IMS node 302 comprising the 200 OK response, the UE 300 can then transmit a first subscription request 308(1) to the IMS node 302 in order to subscribe for notification of the UE's 300 registration status. The first subscription request 308(1) can comprise a SIP request using the SUBSCRIBE method that is generally used to initiate a subscription for notification of events; in this case, the subscription is for notification of the UEs 300 registration status (i.e., a REG event).

FIG. 3 illustrates a scenario where the UE 300 encounters a slightly different type of issue than either of the issues encountered by the UEs 100 and 200 in FIGS. 1 and 2. For instance, in response to the UE's 300 attempt to subscribe for registration status via the first subscription request 308 (1), the IMS node 302 transmits a first subscription response 310(1) to the UE 300 that rejects the first subscription request 308(1) by specifying a type of error in a third error category (e.g., a third error category comprising a 3xx, 4xx, 5xx, or 6xx error type, with the exception of a particular subset of 4xx error types, including at least 401, 403, 408, 421, 422, and 423 error types, and also with the exception of a particular subset of 5xx error types, including at least a 504 error type with, or without, a message body containing "initial registration"). In other words, the third error category includes types of subscription errors other than 401, 403, 408, 421, 422, 423, and 504 error types, wherein the 401, 403, 408, 421, 422, 423, and 504 error types can be considered to be in a different error category than the third error category. In response to encountering an error in the third error category in the first subscription response 310(1), the UE 300 is configured to transmit a second subscription request 308(2) to the IMS node 302. This is in contrast to the logic shown in FIGS. 1 and 2 where, upon encountering the issues illustrated in FIGS. 1 and 2, the UEs 100 or 200 are configured to transmit a subsequent registration request 104. In FIG. 3, instead of transmitting a subsequent registration request, the UE 300 is configured to transmit a second subscription request 308(2), without transmitting another registration request between transmission of the first subscription request 308(1) and the transmission of the second subscription request 308(2).

It is to be appreciated that the first, second, and third error categories described herein can be implemented with different error types in each category. This is due to possible differences in network configuration from one provider to another and the different uses for different error types. For example, in some configurations, the third error category may include some or all of the error types listed in the exception list; that is, the third error category may include, for instance, the 401, 403, 408, and 504 (and possibly other) error types rather than excluding them. Likewise, the second error category may include the 401 and 403 error types in addition to those mentioned above as being included in the second error category.

Additionally, as shown in FIG. 3, the UE 300 is configured to implement the wait time technique described with reference to FIGS. 1 and 2, which is to wait until a lapse of a first period of time 312(1) before transmitting the second subscription request 308(2) to the IMS node 302. The first period of time 312(1) can be determined "on the fly" in response to receiving the first subscription response 310(1) from the IMS node 302. Additionally, in a similar manner to that described with respect to FIGS. 1 and 2, the first period of time 312(1) can be determined based at least in part on a number, N, of subscription requests (e.g., the subscription request 308(1)) that have been transmitted by the UE 300 to the IMS node 302. In the example of FIG. 3, at the time that the UE 300 receives the first subscription response 310(1) where the issue is encountered, there has been one subscription request 308(1) transmitted to the IMS node 302. Accordingly, the UE 100 can determine the first period of time 312(1) using Equation (1), above, where N represents the number of subscription requests 308 that have been transmitted from the UE 300 to the IMS node 302. For example, using Equation (1) with a Base Time=30 seconds, and taking N=1 at the time that the first subscription response 310(1) is received, the first time period 312(1) can be determined as a randomly selected value between the time range of 30 seconds to 60 seconds.

In some embodiments, the period of time 312 (e.g., the first period of time, $T_1$) calculated pursuant to Equation (1) can be superseded, in some instances, by a wait time value that is indicated in a Retry-After header field of the first subscription response 310(1) (or in a Retry-After header field of a different response that is transmitted before or after the first subscription response 310(1)). For example, similar to that described above with reference to FIGS. 1 and 2, a Retry-After header field value may supersede the period of time 312 calculated with Equation (1) if the wait time value specified in the Retry-After header field of a response message is greater than the period of time 312. In these instances, the UE 300 may wait a period of time specified in the Retry-After header field before transmitting a subsequent subscription request to the IMS node 302.

Continuing with the example of FIG. 3, after waiting for a lapse of the first period of time 312(1), the UE 300 transmits the second subscription request 308(2) to the IMS node 302. In response, the IMS node 302 transmits a second subscription response 310(2) that again specifies a type of error in the third error category (e.g., a third error category comprising a 3xx, 4xx, 5xx, or 6xx error type, with the exception of a particular subset of 4xx error types, including at least 401, 403, 408, 421, 422, and 423 error types, and also with the exception of a particular subset of 5xx error types, including at least a 504 error type with, or without, a message body containing "initial registration").

Upon receiving the second subscription response 310(2) where the same issue is encountered as that of the first subscription response 310(1), the UE 300 is configured to wait a second period of time 312(2), where the second period of time 312(2) is different (e.g., greater or longer) than the first period of time 312(1). For instance, using Equation (1), above, where N=2 at the time when the second subscription response 310(2) is received, the second time period 312(2) can be determined by randomly selecting a value in a time range between 60 seconds and 120 seconds, using a Base Time=30 seconds. Thus, the UE 300 is configured to wait a longer period of time 312(2) after encountering the same error in the third error category via the second subscription response 310(2), thereby giving the components in the carrier network more time to resolve the issue that is causing the prohibition of service to the UE 300.

FIG. 3 shows that this "time period" technique can iterate any number of times, and in some cases indefinitely, or at least until some type of event, such as powering down the UE 300 that otherwise stops the process.

Like FIG. 2, FIG. 3 also illustrates that the time period determination algorithm can have a maximum time period. Accordingly, W from Equation (1) meets or exceeds the maximum time period at iteration P-1, the period of time 312(P-1) that the UE 300 waits before transmitting the next subscription request 308(P) equals a randomly selected value within a range of 0.5× the maximum time period and the maximum time period. Furthermore, any subsequent iterations also wait a time period 312 equal to a randomly selected value within a range of 0.5× the maximum time period and the maximum time period. For example, the time period at 312(P) in FIG. 3 can be different from the time period at 312(P-1) because they are randomly determined time periods, but neither time period 312 is to exceed the maximum time period (e.g., 1800 seconds). Thus, the maximum time period acts as a "cap," and the time period determined by the UE 300 for waiting to transmit a next subscription request 308 does not exceed the maximum time period. This can be based on a heuristic that known issues are likely to resolve themselves within the maximum time period, and waiting longer than the maximum time period is unlikely to make any difference to the UE 300.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4A:
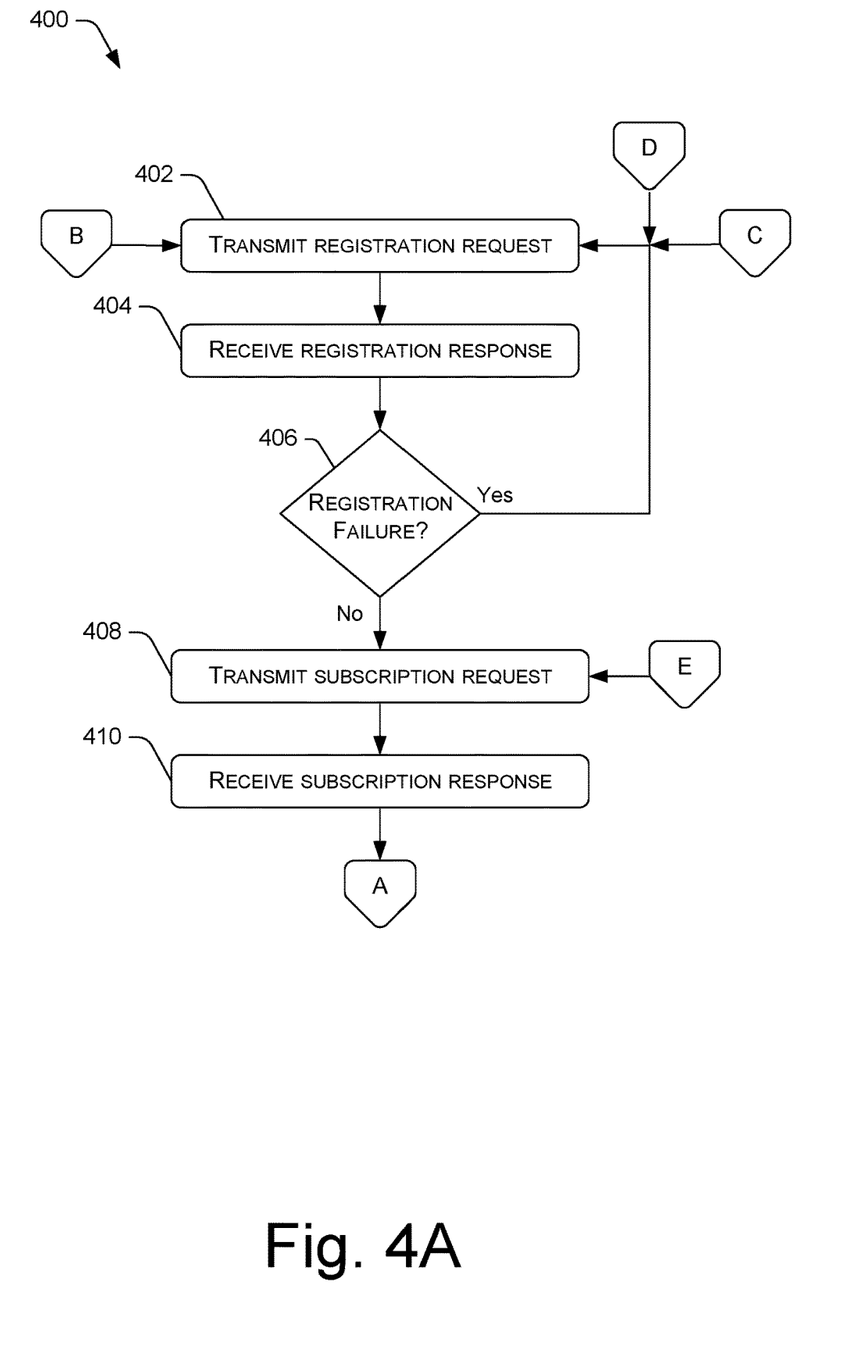
FIGS. 4A and 4B illustrate a flowchart of respective portions of an example process for responding to issues encountered during subscription for registration status.
Figure 4B:
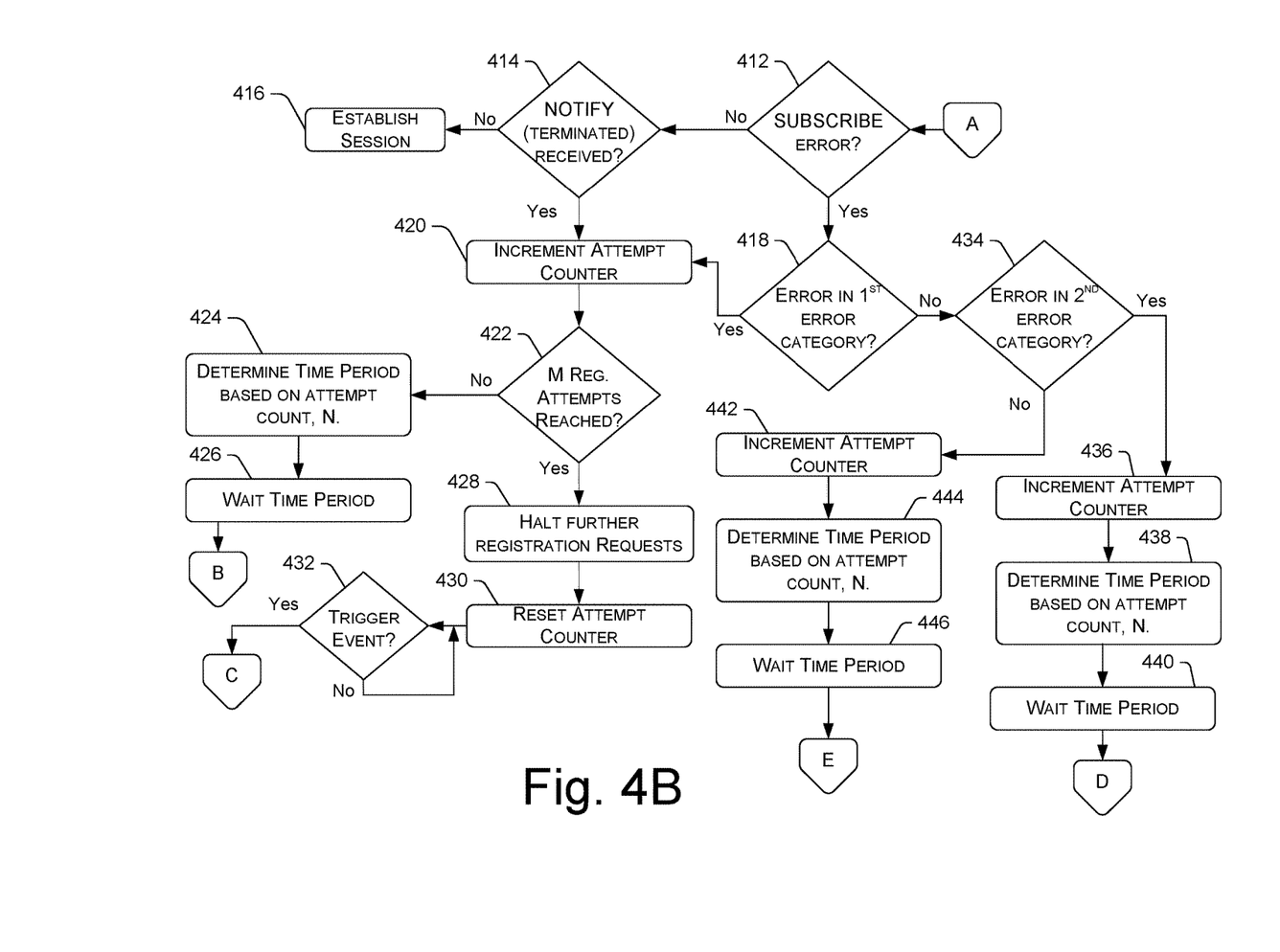

FIG. 4A illustrates a flowchart of a first portion of an example process 400 to be implemented by a UE for responding to issues encountered during subscription for registration status. A second portion of the example process 400 will be described with reference to FIG. 4B, and the relationships between the first portion of the process 400 in FIG. 4A and the second portion of the process 400 in FIG. 4B are shown by the off-page references "A", "B", "C", "D", and "E" in FIGS. 4A and 4B. For purposes of discussion, the process 400 is described with reference to the UEs 100, 200, and 300 of FIGS. 1-3.

At 402, the UE 100, 200, 300 can transmit a registration request to an IMS node, such as the IMS node 102, 202, 302, which may represent a P-CSCF node. The registration request transmitted at 402 can comprise a SIP request using the SIP REGISTER method. A first instance of operation 402 can transmit a first registration request, such as the first registration request 104(1), 204(1), 304(1) of FIGS. 1, 2, and 3, respectively.

At 404, the UE 100, 200, 300 can receive a registration response from the IMS node 102, 202, 302. At 406, the UE 100, 200, 300 can determine, based on the registration response received at 404, whether there is a registration failure. For example, the UE 100, 200, 300 may receive a 3xx, 4xx, 5xx, or 6xx response at 404, and such responses result in a registration failure. If such a registration failure is determined at 406, the process 400 follows the "yes" route from 406 back to 402 so that the UE 100, 200, 300 can re-attempt registration. If, on the other hand, there is no registration failure detected at 406, such as by receiving a 200 OK response from the IMS node 102, 202, 302, the process 400 follows the "no" route to 408 where the UE 100, 200, 300 transmits a subscription request to the IMS node 102, 202, 302.

The subscription request transmitted at 408 can comprise a SIP request using the SUBSCRIBE method. In this case, the subscription request transmitted at 408 is a subscription for notification of the UE's 100, 200, 300 registration status (i.e., a REG event). Also, a first instance of operation 408 can transmit a first subscription request, such as the first subscription request 108(1), 208(1), 308(1) of FIGS. 1, 2, and 3, respectively.

At 410, the UE 100, 200, 300 can receive a subscription response from the IMS node 102, 202, 302, whereby the process 400 proceeds to block 412 of the second part of the process 400, which is shown in FIG. 4B, and is indicated by the off-page reference "A" in FIGS. 4A and 4B.

Continuing from block 410 of FIG. 4A, the UE 100, 200, 300, at decision block 412, determines whether it received a subscription error in the subscription response in the form of a 3xx, 4xx, 5xx, or 6xx error type. If not, then the UE 100, 200, 300 received a subscription response at 410 comprising a 200 OK response, and the process 400 follows the "no" route from 412 to 414 where the UE 100, 200, 300 determines whether it has received a notification of a terminated registration status. If, at 414, the UE 100, 200, 300 determines that it has not received a notification of a terminated registration status (e.g., the UE 100, 200, 300 receives a SIP response using the NOTIFY method and specifying an active registration status), the process 400 follows the "no" route from 414 to 416 where the UE 100, 200, 300 can continue procedures to setup a communication session. The establishment of a communication session at 416 can comprise the UE 100, 200, 300 transmitting a SIP request using the SIP INVITE method to establish a communication session (e.g., a voice call), or any similar type of session using any suitable IMS-based service. In other words, if the process 400 performs blocks 412-416 in sequence the first time the process 400 is performed, then the UE 100, 200, 300 does not encounter an issue during subscription for registration status, and the remaining blocks shown in FIG. 4B need not be performed.

Returning to decision block 412, if the UE 100, 200, 300 determines that the subscription response received at 410 rejects the subscription request by specifying a subscription error, the process 400 follows the "yes" route from 412 to 418, where the UE 100, 200, 300 determines the type of subscription error detected at 412, and whether the type of subscription error is within a first error category. For example, a first error category can include a subset of 4xx error types, such as a subset of 4xx error types including 401, 403, 421, 422, and 423 error types. If the error type falls within the first error category at 418, the process 400 follows the "yes" route from 418 to 420 where an attempt counter is incremented. The attempt counter can represent a count of a number, N, which represents a number of previous registration requests or a number of previous subscription requests transmitted from the UE 100, 200, 300 to the IMS node 102, 202, 302 at the time the process 400 reaches block 420. In the first iteration of the process 400, the attempt counter is incremented from N=0 to N=1 at block 420 because one registration request has been transmitted at 402, and, similarly, one subscription request has been transmitted at 408.

An alternative path from 412 to 420 is via 414. For instance, if no subscription error is detected at 412 (e.g., the UE 100, 200, 300 received a 200 OK response at 410), the process 400 follows the "no" route from 412 to 414. If, at 414, the UE 100, 200, 300 determines that a notification of a terminated registration status has been received (e.g., the 200 OK SIP response was followed by a SIP response from the IMS node 102, 202, 302 using the NOTIFY method and specifying a terminated registration status), the process 400 follows the "yes" route from 414 to 420 where the attempt counter is incremented.

At 422, the UE 100, 200, 300 determines whether a number, N, of registration requests transmitted from the UE 100, 200, 300 to the IMS node 102, 202, 302 is equal to a predetermined number, M, (e.g., a maximum number) of registration requests. The number, N, of registration requests previously transmitted can correspond to the value of the attempt counter after block 420. The predetermined number, M, (e.g., maximum number) of registration requests can be any suitable number, such as three. Thus, in the first iteration of the process 400, when the counter is incremented to N=1 at 420, this number can be compared to the predetermined number, M=3, at block 422, and if N is less than M, the process 400 follows the "no" route from 422 to 424, where an optional determination of a period of time can be performed, where the period of time can be determined based at least in part on the number, N, of previous registration requests transmitted from the UE 100, 200, 300 to the IMS node 102, 202, 302. For example, the period of time can be determined at 424 according to Equation (1), above, where the period of time is a randomly selected value within a time range, the time range being calculated using a Base Time value and the number, N, of previous registration requests transmitted from the UE 100, 200, 300 to the IMS node 102, 202, 302. For example, with one previous registration request transmitted at 402 (i.e., N=1), and a Base Time=30 seconds, the time period determined at 424 can comprise a randomly selected time period between a range of 30 seconds and 60 seconds.

At 426, the UE 100, 200, 300 can wait until a lapse of the period of time determined at 424 before proceeding back to block 402 via the off-page reference "B" in FIGS. 4A and 4B. Once the time period has lapsed, the process 400 iterates by returning to block 402. Alternatively, the process 400 can proceed from 422 directly to 402 without performing blocks 424 and 426. The process 400 can iterate by traversing the blocks of the process 400 from 402 to 426 via any suitable path, and the attempt counter is incremented at 420 on each iteration until the value, N, of the attempt counter equals the predetermined number, M, of registration requests (e.g., N=3; where M=3). Upon determining, at 422 that the number, N, of previous registration requests equals the predetermined number, M, of registration requests, the process 400 follows the "yes" route from 422 to 428 where the UE 100, 200, 300 refrains from transmitting any additional registration requests to the IMS node 102, 202, 302. This reduces network bandwidth consumption by avoiding the transmission of needless registration requests that are unlikely to result in successful registration for the UE 100, 200, 300.

Once the UE 100, 200, 300 decides to stop further transmissions of registration requests at 428, the attempt counter can be reset (e.g., by setting N=0) at 430, and the UE 100, 200, 300 can wait for a trigger event at 432. In some embodiments, the trigger event evaluated at 432 is whether the UE 100, 200, 300 has been powered down and subsequently powered up (e.g., by the user of the UE 100, 200, 300 power cycling the UE 100, 200, 300). In some embodiments, the trigger event evaluated at 432 is whether the UE 100, 200, 300 has moved within range of a different Wi-Fi RAN. For example, the UE 100, 200, 300 may attach to the carrier network via a first Wi-Fi RAN, and the process 400 may iterate through decision block 422 until a maximum number, M, of registration request have been transmitted, and the UE 100, 200, 300 may refrain from transmitting additional registration requests at 428, reset the attempt counter at 430, and wait for the UE 100, 200, 300 to move into range of a second Wi-Fi RAN that is different than the first Wi-Fi RAN. Until the trigger event is detected at 432, the process 400 can iterate at 432 by following the "no"

route from 432 and continually monitoring for occurrence of the trigger event at 432. However, once a trigger event occurs at 432, the process 400 follows the "yes" route back to block 402 via the off-page reference "C" in FIGS. 4A and 4B. In other words, when the UE 100, 200, 300 power cycles, or moves to a new Wi-Fi RAN, it may make sense to attempt registration procedures again, so the process 400 is re-initiated with the attempt counter reset to zero. It is to be appreciated that the UE 100, 200, 300 may also be configured to determine whether it is attached to a carrier network via a Wi-Fi RAN as a condition for refraining from transmitting any additional registration requests at 428. For instance, if the UE 100, 200, 300 determines that it is not attached via a Wi-Fi RAN, it may forego blocks 422, 428, 430, and 432, and instead proceed directly from block 420 to block 424. In this scenario, the process 400 may iterate an indefinite number of times under the assumption that the issue is recoverable.

Returning to decision block 418 of FIG. 4B, if the error detected at 412 is not within the first error category, the process 400 follows the "no" route from 418 to 434 where a determination is made as to whether the error detected at 412 is within a second error category (e.g., a second error category comprising a 504 error type with a message body containing "initial registration" and a transaction timeout (Timer F expired) pursuant to 3GPP 24.229 5.1.2A. 1.6, or a 408 or 504 error type with no message body). If, at 434, it is determined that the error detected at 412 is within the second error category, the process 400 follows the "yes" route from 434 to 436 where an attempt counter is incremented. At 436, the attempt counter can represent a number, N, of previous registration requests or subscription requests transmitted from the UE 100, 200, 300 to the IMS node 102, 202, 302. In the first iteration of the process 400, there has been one registration request transmitted at 402 and one subscription request transmitted at 408, so the attempt counter can be incremented to N=1, representing one previous registration request or one previous subscription request.

At 438, a period of time can be determined based at least in part on the number, N, of previous registration requests or subscription requests transmitted from the UE 100, 200, 300 to the IMS node 102, 202, 302. For example, the period of time can be determined at 438 according to Equation (1), above, where the period of time is a randomly selected value within a time range that is calculated using a Base Time value and the number, N, of previous registration requests or subscription requests transmitted from the UE 100, 200, 300 to the IMS node 102, 202, 302. For example, with one previous registration request or one previous subscription request transmitted at 402 or 408, respectively (i.e., N=1), and a Base Time=30 seconds, the time period determined at 438 can comprise a randomly selected time period between a time range of 30 seconds and 60 seconds.

At 440, the UE 100, 200, 300 can wait until a lapse of the period of time determined at 438 before proceeding back to block 402 via the off-page reference "D" in FIGS. 4A and 4B. Once the time period has lapsed, at 440, the process 400 iterates by returning to block 402. In some embodiments, the process 400 can iterate by following the "yes" route from decision block 434 through block 440 an indefinite number of times. However, it is to be appreciated that a fixed number of registration requests can be implemented in a similar fashion to the implementation of the fixed number of registration request at decision block 422. When an indefinite number of iterations is implemented, the assumption is that the issue encountered in the subscription response received at 410 is a recoverable one, and that, given enough time, the issue may resolve itself. Therefore, the determination of the incremental and random time periods by iterating over blocks 436-440 allows time for the issue to resolve itself. This is improved with respect to existing UE procedures that immediately transmit re-attempt requests to the network, or that transmit re-attempt requests at the same, fixed interval, which does not giving the network time to recover If, at 434, it is determined that the error detected at 412 is not within the second error category (or the first error category), an attempt counter is incremented at 442. At 442, the attempt counter can represent a number, N, of previous subscription requests transmitted from the UE 100, 200, 300 to the IMS node 102, 202, 302. In the first iteration of the process 400, there has been one subscription request transmitted at 408, so the attempt counter can be incremented to N=1, representing one previous subscription request.

At 444, a period of time can be determined based at least in part on the number, N, of previous subscription requests transmitted from the UE 100, 200, 300 to the IMS node 102, 202, 302. For example, the period of time can be determined at 444 according to Equation (1), above, where the period of time is a randomly selected value within a time range that is calculated using a Base Time value and the number, N, of previous subscription requests transmitted from the UE 100, 200, 300 to the IMS node 102, 202, 302. For example, with one previous subscription request transmitted at 408 (i.e., N=1), and a Base Time=30 seconds, the time period determined at 444 can comprise a randomly selected time period between a time range of 30 seconds and 60 seconds.

At 446, the UE 100, 200, 300 can wait until a lapse of the period of time determined at 444 before proceeding back to block 408 via the off-page reference "E" in FIGS. 4A and 4B. Once the time period has lapsed, at 446, the process 400 iterates by returning to block 408, without performing blocks 402-406. In some embodiments, the process 400 can iterate by following the "no" route from decision block 434 through block 446 an indefinite number of times. However, it is to be appreciated that a fixed number of subscription requests can be implemented in a similar fashion to the implementation of the fixed number of registration request at decision block 422. When an indefinite number of iterations is implemented, the assumption is that the issue encountered in the subscription response received at 410 is a recoverable one, and that, given enough time, the issue may resolve itself. Therefore, the determination of the incremental and random time periods by iterating over blocks 442-446 allows time for the issue (e.g., high network congestion) to resolve itself. This is improved with respect to existing UE procedures that immediately transmit re-attempt requests to the network, or that transmit re-attempt requests at the same, fixed interval, which does not giving the network time to recover.

Thus, the process 400 illustrates techniques for responding to issues encountered during subscription for registration status that are improved over existing UE procedures. For instance, the implementation of the fixed number of registration attempts illustrated by blocks 422 and 428 (as well as in FIG. 1 at 114) reduces network bandwidth consumption by refraining from transmitting needless registration requests that are unlikely to resolve a currently encountered issue. Additionally, the incremental and randomized time period determination illustrated by blocks 424 and 426 and/or 438 and 440 and/or 444 and 446 (as well as FIGS. 1, 2, and 3 at 112, 212, and 312, respectively) provides the network components time to recover from recoverable issues that may otherwise be exacerbated by existing UE procedures that do not allow the network any time to recover.

Figure 5:
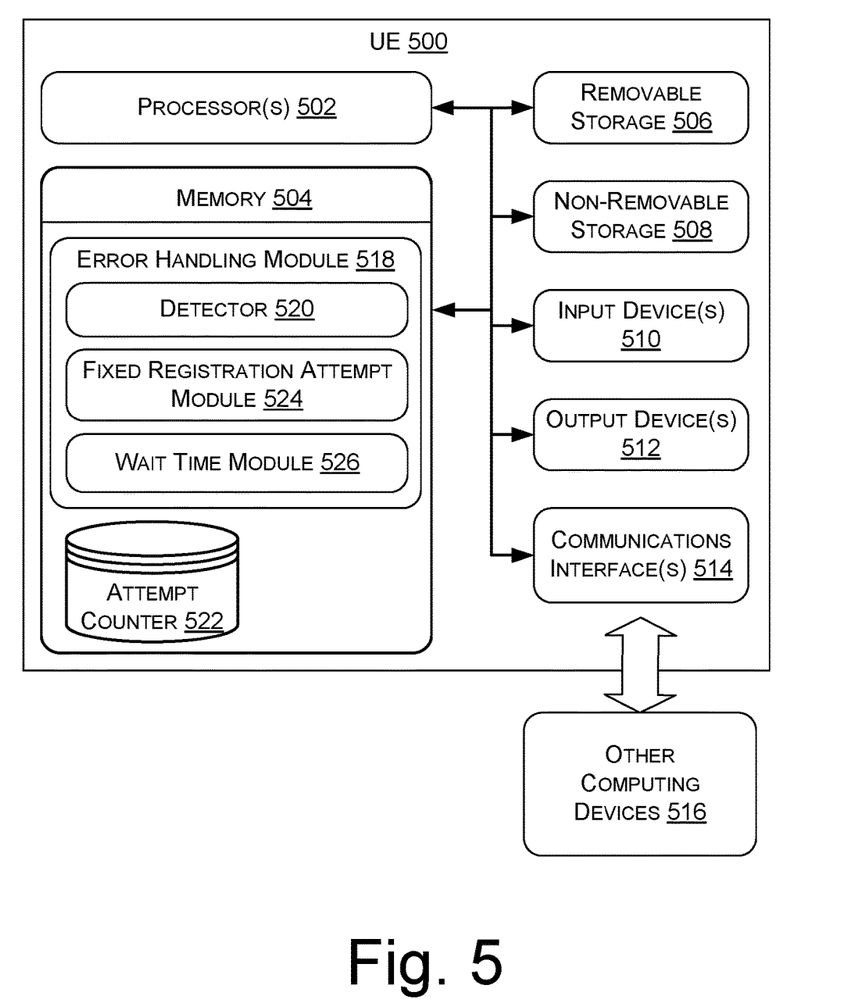
FIG. 5 is a block diagram of an example UE with logic for responding to issues encountered during subscription for registration status.

FIG. 5 is a block diagram of an example UE 500 with logic for responding to issues encountered during subscription for registration status. The UE 500 may be representative of the UE 100 of FIG. 1, the UE 200 of FIG. 2, and/or the UE 300 of FIG. 3, and may be configured to implement the signaling shown in FIGS. 1, 2, and/or 3, as well as the process 400 shown in FIGS. 4A and 4B.

As shown, the UE 500 may include one or more processors 502 and one or more forms of computer-readable memory 504. The UE 500 may also include additional storage devices. Such additional storage may include removable storage 506 and/or non-removable storage 508.

The UE 500 may further include input devices 510 and output devices 512 communicatively coupled to the processor(s) 502 and the computer-readable memory 504. The UE 500 may further include communications interface(s) 514 that allow the UE 500 to communicate with other computing devices 516 (e.g., IMS nodes 102, 202, 302) such as via a network(s). The communications interface(s) 514 may facilitate transmitting and receiving wired and/or wireless signals over any suitable communications/data technology, standard, or protocol, as described herein. For example, the communications interface(s) 514 can comprise one or more of a cellular radio, a wireless (e.g., IEEE 802.1x-based) interface, a Bluetooth® interface, and so on. In some embodiments, the communications interface(s) 514 may allow for attachment to a carrier network (e.g., an LTE network) via a non-3GPP RAN (e.g., a Wi-Fi AP and the Internet). The communications interface(s) 514 may further enable the UE 500 to communicate over circuit-switch domains and/or packet-switch domains.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 500. Any such computer-readable storage media may be part of the UE 500.

The memory 504 can include error handling module 518 (i.e., computer-executable instructions (or logic) that, when executed, by the processor(s) 502, perform the various acts and/or processes disclosed herein). For example, the error handling module 518 can be configured to determine how best to respond to a subscription response received from an IMS node 102, 202, 302 that presents an issue in successfully registering for service. For instance, the error handling module 518 can implement a detector 520, which is configured to detect a subscription error at block 412 of the process 400, and to determine the type of subscription error and whether it falls into a particular error category at 418 and/or 434. The detector 520 may also be configured to determine when a 200 OK response is received in response to a subscription request (e.g., a SIP request using the SUBSCRIBE method), and is followed by a notification of a terminated registration status at 414. When the detector 520 detects these various types of issues or errors in response to a subscription request, the detector 520 may be configured to increment an attempt counter 522 at blocks 420, 436, and/or 442 of the process 400. The attempt counter can be utilized for various purposes, including, without limitation, the determination of a time period for the UE to wait before transmitting any subsequent registration request or subscription request, depending on what part of the process 400 is being carried out, or the determination at 422 as to whether a maximum number of registration requests have been transmitted from the UE 100, 200, 300 to the IMS node 102, 202, 302.

The error handling module 518 may further include a fixed registration attempt module 524 to implement the logic for halting the transmission of any additional registration request at 428 until a trigger event occurs at 432. As noted herein, this fixed registration attempt module 524 is particularly useful when the UE encounters an unrecoverable error in response to a subscription request, such as a missing 911 location. The fixed registration attempt module 524 may be provided access to the attempt counter 522 for determining whether the number of previous registration attempts have reached a predetermined (e.g., maximum) number of registration attempts.

The error handling module 518 may further include a wait time module 526 that is configured to dynamically determine a randomly selected wait time for purposes of staggering sequentially transmitted requests (e.g., registration requests or subscription requests). The wait time module 526 can utilize Equation (1) to determine a period of time at any given iteration of the process 400 based on the value of the attempt counter 522. For example, as the number of previous registration or subscription attempts counted by the attempt counter 522 increases, the time period calculated by the wait time module 526 increases, thereby configuring the UE 500 to wait longer and longer periods of time before transmitting any subsequent registration or subscription request to the IMS node 102, 202, 302.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A device comprising:
a processor; and
memory storing computer-executable instructions that, when executed by the processor, cause the device to:
transmit a registration request to an Internet Protocol Multimedia Subsystem (IMS) node;
receive a registration response to the registration request;
transmit a subscription request to the IMS node;
receive a subscription response that (i) rejects the subscription request by specifying a type of error in a first error category, or (ii) notifies the device of a terminated registration status;
determine, at a time after transmitting the registration request, that a number of registration requests transmitted from the device to the IMS node is equal to a predetermined number of registration requests; and
refrain from transmitting any additional registration requests until an occurrence of a trigger event,
wherein the computer-executable instructions, when executed, further cause the device to determine that the device is attached to a carrier network via a Wi-Fi radio access network as a condition for refraining from transmitting any additional registration requests.

2. The device of claim 1, wherein the computer-executable instructions, when executed, further cause the device to, prior to transmitting the registration request:
transmit an initial registration request to the IMS node;
receive an initial registration response to the initial registration;
transmit an initial subscription request to the IMS node;
receive an initial subscription response that (i) rejects the initial subscription request by specifying the type of error, or (ii) notifies the device of the terminated registration status;
determine, at a time after transmitting the initial registration request and before transmitting the registration request, that a second number of registration requests transmitted from the device to the IMS node is less than the predetermined number of registration requests; and
determine a period of time based at least in part on the second number of registration requests,
wherein transmitting the registration request to the IMS node is performed in response to a lapse of the period of time.

3. The device of claim 2, wherein the period of time is determined by randomly selecting a time within a time range, the time range being calculated based at least in part on the second number of registration requests.

4. The device of claim 1, wherein the trigger event comprises powering down the device and subsequently powering up the device.

5. The device of claim 1, wherein the type of the error is a 403 forbidden error.

6. A method comprising:
prior to transmitting a registration request:
transmitting, by a user equipment (UE), an initial registration request to an Internet Protocol Multimedia Subsystem (IMS) node,
receiving, by the UE, an initial registration response to the initial registration request,
transmitting, by the UE, an initial subscription request to the IMS node, and
receiving, by the UE, an initial subscription response that (i) rejects the initial subscription request by specifying a type of error in a first category, or (ii) notifies the UE of a terminated registration status;
determining, at a time after transmitting the initial registration request and before transmitting the registration request, that a second number of registration requests transmitted from the UE to the IMS node is less than a predetermined number of registration requests;
determining a period of time based at least in part on the second number of registration requests;
transmitting, by the UE, a registration request to the IMS node, wherein transmitting the registration request to the IMS node is performed in response to a lapse of the period of time;
receiving, by the UE, a registration response to the registration request;
transmitting, by the UE, a subscription request to the IMS node;
receiving, by the UE, a subscription response that (i) rejects the subscription request by specifying the type of error, or (ii) notifies the UE of the terminated registration status;
determining, at a time after transmitting the registration request, that a number of registration requests transmitted from the UE to the IMS node is equal to the predetermined number of registration requests; and
refraining from transmitting any additional registration requests until an occurrence of a trigger event.

7. The method of claim 6, wherein the period of time is determined by randomly selecting a time within a time range, the time range being calculated based at least in part on the second number of registration requests.

8. The method of claim 6, wherein the trigger event comprises powering down the UE and subsequently powering up the UE.

9. The method of claim 6, wherein:
the UE is attached to a carrier network via a first Wi-Fi radio access network; and
wherein the trigger event comprises the UE moving within range of a second Wi-Fi radio access network.

10. The method of claim 6, further comprising determining that the UE is attached to a carrier network via a Wi-Fi radio access network, wherein refraining from transmitting any additional registration requests is conditioned on the UE being attached via the Wi-Fi radio access network.

11. The method of claim 6, wherein the type of the error is a 403 forbidden error.

12. A method comprising:
transmitting, by a user equipment (UE), a first registration request to an Internet Protocol Multimedia Subsystem (IMS) node;
receiving, by the UE, a first registration response to the first registration request;
transmitting, by the UE, a first subscription request to the IMS node;

receiving, by the UE, a first subscription response that (i) rejects the first subscription request by specifying a type of error, or (ii) notifies the UE of a terminated registration status;

determining, at a time after transmission of the first subscription request, a period of time, the period of time being determined based at least in part on a number of subscription requests or a number of registration requests transmitted by the UE to the IMS node; and in response to a lapse of the period of time, transmitting, by the UE, a second subscription request to the IMS node, wherein the period of time is determined by randomly selecting a time within a time range, the time range being calculated based at least in part on the number of subscription requests or the number of registration requests.

13. The method of claim 12, further comprising receiving, by the UE, a second subscription response that notifies the UE of an active registration state.

14. The method of claim 12, wherein the first subscription response rejects the first subscription request by specifying the type of error, the method further comprising:

determining that the type of error is in a particular error category, wherein transmitting the second subscription request occurs without transmitting a second registration request in between transmission of the first subscription request and transmission of the second subscription request.

15. The method of claim 12, further comprising, prior to transmitting the second subscription request:

transmitting, by the UE, a second registration request to the IMS node; and receiving, by the UE, a second registration response to the second registration request.

16. The method of claim 15, further comprising:

receiving, by the UE, a second subscription response that (i) rejects the second subscription request by specifying the type of error, or (ii) notifies the UE of the terminated registration status;

determining a second period of time that is greater than the period of time;

in response to a lapse of the second period of time, transmitting, by the UE, a third registration request to the IMS node;

receiving, by the UE, a third registration response to the third registration request; and transmitting, by the UE, a third subscription request to the IMS node.

17. The method of claim 16, further comprising:

receiving, by the UE, a third subscription response that (i) rejects the third subscription request by specifying the type of error, or (ii) notifies the UE of the terminated registration status;

determining, at a time after transmitting the third registration request, that a number of registration requests transmitted from the UE to the IMS node is equal to a predetermined number of registration requests; and refraining from transmitting any additional registration requests until an occurrence of a trigger event.

\* \* \* \* \*